W. L. PAUL.
GANG PLOW.
APPLICATION FILED APR. 27, 1908.
1,054,139.
Patented Feb. 25, 1913.
2 SHEETS—SHEET 2.
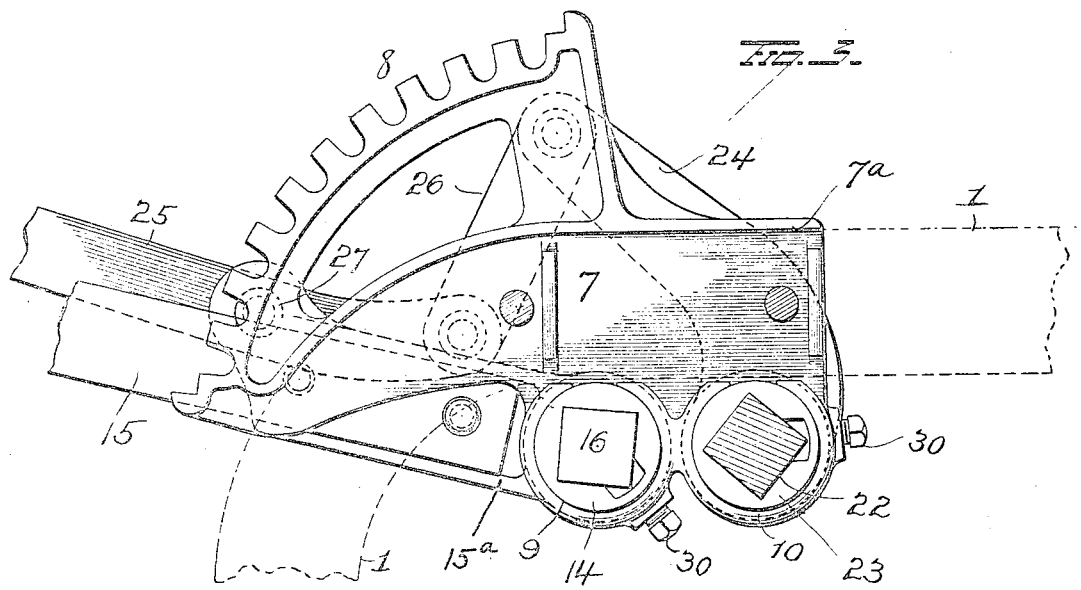
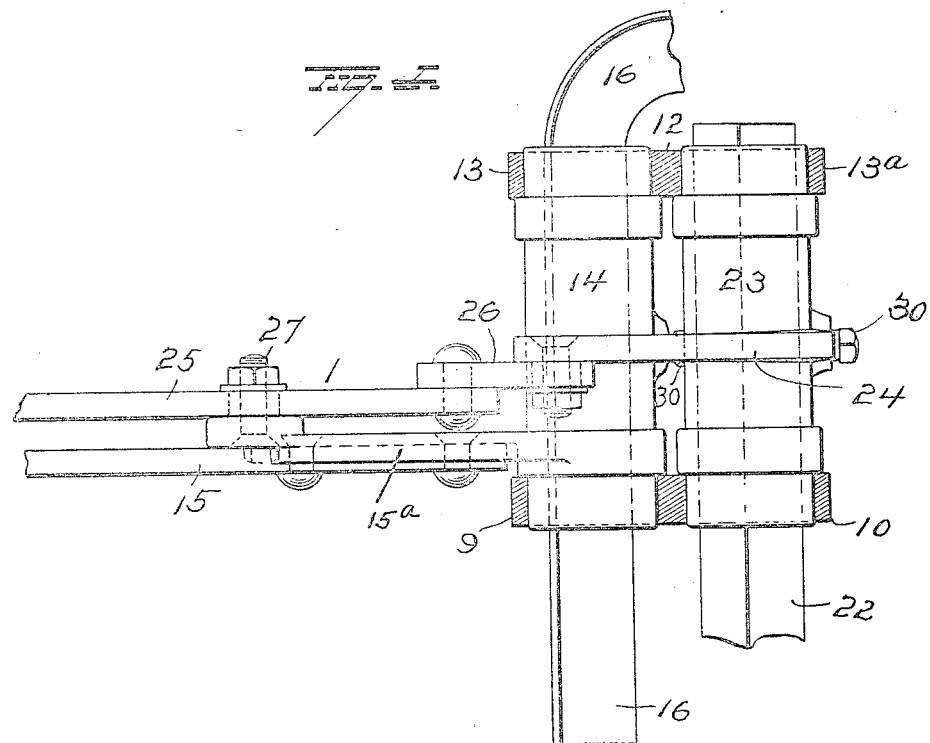
WITNESSES
E. J. Nottingham
G. F. Downing
INVENTOR
W. L. Paul
By H. A. Seymour
Attorney

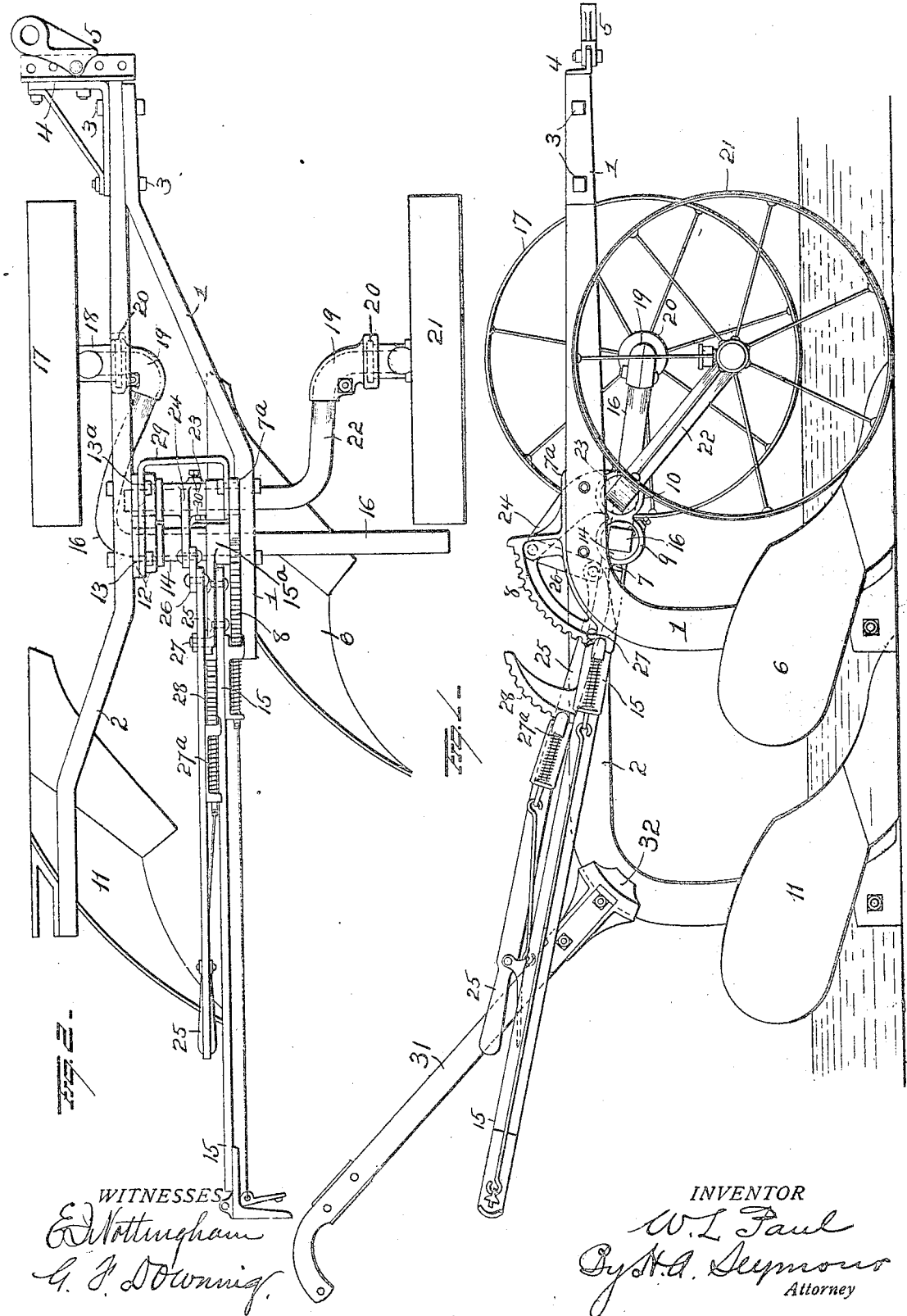

UNITED STATES PATENT OFFICE.

WILLIAM L. PAUL, OF SOUTH BEND, INDIANA, ASSIGNOR TO OLIVER CHILLED PLOW WORKS, OF SOUTH BEND, INDIANA.

GANG-PLOW.

1,054,139.  Specification of Letters Patent.  Patented Feb. 25, 1913.

Application filed April 27, 1908. Serial No. 429,499.

*To all whom it may concern:*

Be it known that I, WILLIAM L. PAUL, of South Bend, in the county of St. Joseph and State of Indiana, have invented certain new and useful Improvements in Gang-Plows; and I do hereby declare the following to be a full, clear, and exact description of the invention, such as will enable others skilled in the art to which it appertains to make and use the same.

My invention relates to an improvement in gang plows designed more particularly for use in orchards or vineyards, the object being to provide a compact device of the character described, so constructed that it may work well up to trees or vines, and under overhanging branches without engaging same, and it consists in the parts and combinations of parts as will be more fully described and pointed out in the claim.

In the accompanying drawings, Figure 1 is a view in side elevation of my improved plow. Fig. 2 is a view in plan of same, and Fig. 3 is an enlarged view in side elevation of a portion of one of the beams, the two axles and their bearings and the lever connections between the two axles and Fig. 4 is a plan view of the structure shown in Fig. 3.

1 and 2 represent the plow beams, the latter being inclined outwardly at its rear end so as to carry the landside of its plow in a plane outside the land wheel as clearly shown in Fig. 2. The rear end of beam 1 is parallel with the straight front portion of beam 2, and its front portion is bent inwardly and connected by bolts 3 with beam 2. Secured to the front end of beams 1 and 2, by the bolts 3, is the bracket 4 to which the clevis 5 is secured by bolts as shown. Secured to the rear portion of beam 1 in a plane above its plow 6, is the axle carrying frame 7 having the integral toothed segment 8. This frame 7 has a flange 7ª resting on the top surface of beam 1, and is provided with the bearings 9 and 10 in a plane below said beam. This frame 7 is firmly bolted to the beam with the toothed segment in the arc of a circle concentric with the bearing 9. Secured to the inner face of beam 2, carrying plow 11, is the frame 12 having bearings 13 and 13ª in alinement with the bearings 9 and 10 in frame 7. Mounted at its ends in bearings 9 and 13 is the sleeve 14 to which the longer lever 15 is rigidly connected through the medium of a lever arm or casting 15ª. This lever has a spring pressed dog adapted to engage the teeth of the segment 8 carried by beam 1. Sleeve 14 is provided with an angular or square bore through same for the passage of crank axle 16 on which is journaled land wheel 17. This axle is bent as shown in Fig. 2, and is provided at its outer end with a rounded spindle to receive the inwardly projecting hub 18 on ground wheel 17. Secured to the axle at the juncture of the axle and spindle is the securing collar 19 provided at its outer end with a flange adapted to overlap the flange 20 on the inner end of the hub as shown in Fig. 2 and thus lock the wheel to the axle. The furrow wheel 21 is also secured to its axle 22 in the same manner. Furrow wheel axle 22 is also crank shape and its angular body passes through the angular bore in sleeve 23 mounted at its ends in bearings 10 and 13ª. The hubs of the wheels project inwardly sufficiently far to provide the necessary bearing for the wheels, and preferably terminate on the outer sides of the wheels within the vertical planes of the outer edges of the tires so as not to project beyond the latter. By this construction there are no projections on the outer side of the wheels beyond the outer edges of the tires.

Sleeve 23 is parallel with sleeve 14 and is provided with an upwardly projecting fixed or integral arm 24, which is connected at its free upper end to the lower end of the short lever 25, by the link 26. This lever 25 is pivotally connected at 27 to the arm or casting 15ª of the longer lever 15 and carries a spring actuated dog 27ª adapted to engage the toothed segment 28 carried by the lever 15. The bearing frames 7 and 12 are secured to their respective beams 1 and 2, and are connected by the yoke 29 which prevents any spreading of the beams at the points where the axles pass through their respective bearings. The axles are of sufficient length to permit of the necessary adjustment of the wheels 17 and 21 by the longitudinal adjustment of said axles through the sleeves and set screws 30 are provided to lock the axles in place.

As shown in Fig. 1, when the plows are lowered, both levers are down, or approximately horizontal, and out of the way of any overhanging boughs or vines. If, when the parts are as shown in Fig. 1, the longer lever 15 be released from its segment and pushed upwardly, the sleeve 14 and its axle 11 will be turned, and acting through the shorter lever 25 (which is then locked to the longer lever), through link 26 and arm 24, turns sleeve 23 and its axle. This simultaneous movement of both sleeves 14 and 23, and their axles, carries the land wheel 17 and furrow wheel 21 to the rear, thus elevating the plows, and bringing the furrow wheel to the horizontal plane of the land wheel. The movement of lever 15 alone does this by virtue of the arrangement of leverages in which one axle describes a greater arc than the other. The lever 25 is for adjusting the furrow wheel, independently of the land wheel, while lever 15 actuates both wheels. In the drawing, Fig. 1 the plow is shown at work and the furrow wheel in a furrow made by a previous trip of the plow. To make the first furrow, both wheels must run above the plane of the lower level of the bodies of the plows, hence before starting to open up the land, the lever 25 should be raised and thus elevate the furrow wheel to a level with the land wheel. After the first furrow has been opened, lever 25 should be depressed to the position shown in the drawings, thus lowering the furrow wheel. With this construction the land wheel may be set inside of the plane of the cutting line of the plow 11, thus permitting the plow to be used close up to the trees or vines. Again the construction is such that when the plow is working all its levers are down, or in approximately horizontal positions, and hence out of the way of all overhanging boughs and vines. A handle 31 is provided for steadying the plow while turning corners. This handle is secured to the beam 2 near the rear end of the latter by means of a suitable coupling device 32.

It is evident that changes in the construction and relative arrangement of the several parts might be made without avoiding my invention and hence I would have it understood that I do not restrict myself to the particular construction and arrangement of parts shown and described, but,—

Having fully described my invention what I claim as new and desire to secure by Letters-Patent, is:—

In a gang plow, the combination with two plow beams, of bearing frames secured to the respective beams, a rigid yoke connecting said frames, transverse sleeves revolubly mounted in said frames, crank axles longitudinally adjustable through and rotatable with said sleeves, wheels in which the outer ends of said crank axles are mounted, a lever rigid with one of said sleeves, a toothed segment rigid with one of said bearing frames, a detent on said lever to engage said segment, an arm on the other sleeve, a second lever connected with the first-mentioned lever, a link connecting said second lever with the arm on one of said sleeves, a toothed segment on the first-mentioned lever, and a detent on the second lever to engage said last-mentioned toothed segment.

In testimony whereof, I have signed this specification in the presence of two subscribing witnesses.

WILLIAM L. PAUL.

Witnesses:
 CLYDE C. McDONALD,
 THOS. A. FREEMAN.